(12) United States Patent
Hays et al.

(10) Patent No.: US 8,584,036 B2
(45) Date of Patent: Nov. 12, 2013

(54) SHAPE ELASTICITY IN VISUAL LAYOUT

(75) Inventors: Christopher A. Hays, Monroe, WA (US); Rajeev Karunakaran, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 836 days.

(21) Appl. No.: 11/801,920

(22) Filed: May 11, 2007

(65) Prior Publication Data

US 2008/0282188 A1    Nov. 13, 2008

(51) Int. Cl.
*G06F 3/048*    (2013.01)

(52) U.S. Cl.
USPC ................. 715/798; 715/788; 715/765

(58) Field of Classification Search
USPC ............................. 715/788, 798, 765
See application file for complete search history.

(56) References Cited

U.S. PATENT DOCUMENTS

| | | | |
|---|---|---|---|
| 5,583,981 A | 12/1996 | Pleyer | |
| 5,671,378 A | 9/1997 | Acker et al. | |
| 5,751,283 A | 5/1998 | Smith | |
| 5,760,772 A | 6/1998 | Austin | |
| 5,796,401 A | 8/1998 | Winer | |
| 5,873,106 A | 2/1999 | Joseph | |
| 6,054,985 A | 4/2000 | Morgan et al. | |
| 6,335,743 B1 * | 1/2002 | Owings | 715/801 |
| 6,750,887 B1 | 6/2004 | Kellerman et al. | |
| 6,950,993 B2 * | 9/2005 | Breinberg | 715/801 |
| 7,134,093 B2 | 11/2006 | Etgen et al. | |
| 2005/0108656 A1 * | 5/2005 | Wu et al. | 715/801 |
| 2006/0103667 A1 * | 5/2006 | Amit et al. | 345/619 |

OTHER PUBLICATIONS

"ActiveResize Control Professional (ActiveX Control)", http://www.vbgold.com/, Mar. 1, 2007.
"ActiveResize Control Lite", http://www.dirfile.com/freeware/parent.htm, Mar. 1, 2007.
"Primitives and Containers: Arranging Your Interface", http://glam.sourceforge.net/docs/handbook/ch03s02.html, Mar. 1, 2007.
Resizing visual components in the visual editor for Java, retrieved from <http://help.eclipse.org/help32/topic/org.eclipse.ve.doc/topics/tve_component_resize.html> on Mar. 1, 2007, 1 page.

* cited by examiner

*Primary Examiner* — Andrea Leggett

(57) ABSTRACT

Resizing and/or repositioning a target object related by containment to one or more related object laid out on a computer user interface. Original sizes and/or positions of the related objects to the target object resized and/or repositioned are stored. During the resize and/or reposition operation of the target object, an impact on a related object is calculated based upon a change from the stored original sizes and/or positions of the related object.

20 Claims, 6 Drawing Sheets

SHAPE ELASTICITY IN VISUAL LAYOUT

BACKGROUND

1. Field

The embodiments discussed herein relate to visual layouts by a computer.

2. Description of the Related Art

For example, WYSIWYG (What You See Is What You Get) tools are commonly used when designing two-dimensional visual layouts in a variety of domains including user interface design (e.g. dialogs and forms), diagramming and reporting. In each such domain, the productivity of the layout designer is determined largely by subtle usability factors within a layout tool itself. One such usability factor is the ability of the designer to tentatively experiment with alternate layouts of elements of a user interface by comparing and contrasting them and retaining the ability to restore the original, unaltered state. More specifically, some of such design tools suffer from poor usability when there are sizing interactions between objects and their containers.

SUMMARY

It is an aspect of one or more embodiments discussed herein to provide mechanisms by which layout design tools can provide "elastic" object resizing and/or repositioning which preserves the original sizes and/or positions of impacted object(s), and restores intermediate layout states of the impacted object(s) as the designer experiments with sizes and/or positions of target object(s).

The embodiments are not limited to drawing and diagramming computing tools, but can be applied to any computing tools providing a visual layout, such as (without limitation) data table designers, for example, MICROSOFT SQL server, MICROSOFT EXCEL, etc.

The embodiments resize and/or reposition (i.e., resize, reposition or both) a target object related by containment to one or more related objects laid out on a computer user interface. One embodiment stores (retains) original sizes and/or positions of the one or more objects related by containment (containing or being contained) to the target object being resized and/or repositioned by the user. During the resize and/or reposition operation of the target object, an impact on the related objects is calculated based upon a change from the stored original sizes and/or positions of the related objects.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION OF THE EMBODIMENTS

Figure 1A:
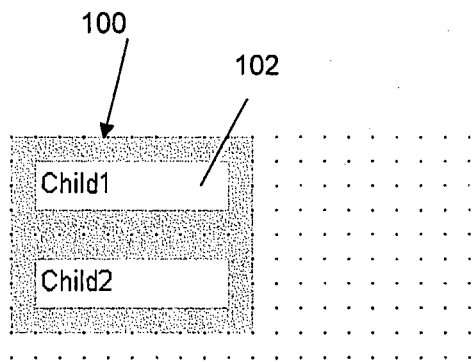
FIGS. 1A-1C are diagrams of transitions for enlarging a child (contained) object to extend outside of a parent (container) object.

Layout design tools can generally handle object containment three different ways. Object containment refers to a situation where an object contains (contain wholly and/or partially) one or more objects and at least one of the contained objects can be resized and/or repositioned within the container alone or together with the container, or the container can be resized and/or repositioned alone or together with the contained objects, or the container or the contained object can be non-proportionally resized, or any combinations thereof.

One class of layout design tools does not support containment but does allow overlapping items (objects). In such tools, overlapping items may not impact one another's size/position when resizing/repositioning. As a result, when a designer experiments with varying sizes/positions of objects that look like child objects, the parent objects must be manually altered to match (and vice versa). Frequently such tools implement a "grouping" mechanism wherein a number of objects are treated as a single unit for resize and reposition operations. Object grouping provides some limited improvement in usability for the case where the designer wishes to resize the parent and child proportionally, but does not help with contained object and/or container experimentation, such as relative motion of the child within the parent or non-proportional resizing of the parent or child. MICROSOFT VISIO is an example of a layout design tool in this class.

A second class of layout design tools does not support containment and instead utilizes a continuous surface consisting of contiguous (adjacent) design elements (objects). In such tools, resizing an object adjusts the size of adjacent objects as a group of objects by an equal amount (an electronic spreadsheet is an example of such a tool) or upon impact with an immediately adjacent object, adjusts the size of the immediately adjacent object by an equal amount up, through a minimum object size at which point the objects can revert to adjusting their sizes (some table design tools use this approach).

A third class of layout tools supports containment. These tools manage the spatial interaction between containers and contained objects in a limited number of ways.

1. Enlarging or moving a child object to a size or position where it would extend beyond the edge of its container object results in the container automatically growing or extending to accommodate the extension or movement of the child object.

2. Shrinking a container to a size where a child would protrude beyond the edge of the container might be prohibited, such that upon impact of the shrinking container with the child object, both the container and the child object automatically shrink together.

3. Shrinking or enlarging a container which is wholly comprised of component children results in the children proportionally shrinking or enlarging.

In none of these classes of tools does the user have the ability to non-destructively experiment with alternative sizes and positions of children and parents that are related by containment. In the first two classes of tools, the parent/child interaction is simply not maintained, because such tools do not support containment wherein a contained object can be resized and/or repositioned within a parent or do not support non-proportional resizing of the parent or the child. But such tools only support parent/child interaction based upon object grouping wherein a number of objects are treated as a single unit for resize and/or reposition operation.

In the third class of tools, if parent/child interaction is supported, the parent/child interaction is a destructive operation during a resize/reposition experiment of a target object by failing to preserve both the original state and the intermediate states of impacted objects observed by the designer during the experiment. In other words, when the relative spatial relationship between the parent and the child is automatically maintained during an experimental resizing and/or repositioning operation (which causes resizing and/or repositioning of the parent and/or the child), the original relative positions of the child and parent objects are destroyed, lost or ignored, as discussed below by referring to FIGS. 1A-1C and 2A-2C.

Figure 1B:
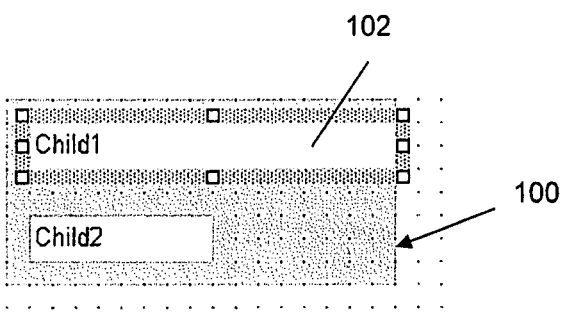
Figure 1C:
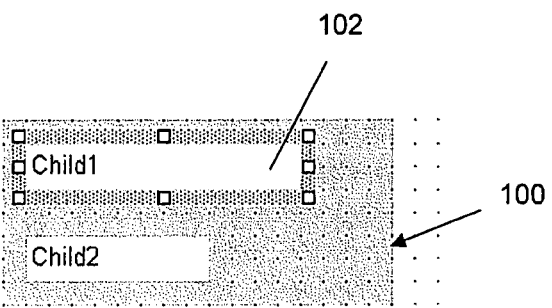

For example, FIGS. 1A-1C are diagrams of transitions for enlarging a child (contained) object to extend outside of a parent (container) object. In FIGS. 1A-1C, a parent object 100 contains a child object 102. In FIGS. 1A-1C, enlarging a contained object to extend outside of its container refers to when a designer at first enlarges the child object 102 (e.g., by dragging the right edge of the child object 102), such that the extending child object 102 causes the objects' parent 100 to grow to the right (FIG. 1B). If the enlargement experiment of the child object 102 goes further than intended (FIG. 1B), the designer (in the same resize operation) shrinks the child object 102 (FIG. 1C). When this happens, in FIG. 1C the parent object 100 will retain a size larger than necessary, because the applicable parent/child object interaction rule might provide that the child object 102 can shrink within the parent object 100 without shrinking the parent object 100. In other words, in FIG. 1C shrinking of a contained object does not cause a container to shrink. This causes the resize (enlarging and shrinking) experiment of the child object 102 to be destructive or have an unintended consequence when reversing the enlargement of the child object 102 that has extended beyond an original size of the parent object 100 by failing during the shrinking of the child object 102 to preserve any intermediate container configuration subsequent to growth of the container. The resize operation was destructive, because when the parent object 100 enlarges together with the enlargement of the child object 102, the original and/or intermediate sizes of the child object 102 and the parent object 100 during the child object 102 resizing (enlarging and shrinking) experiment cannot be recovered or reestablished.

Figure 2A:
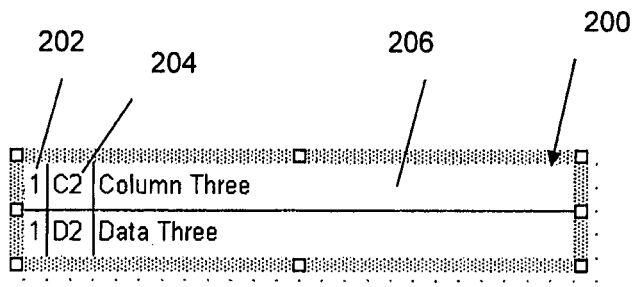
FIGS. 2A-2C are diagrams of transitions for shrinking a parent (container) object containing children (contained) objects of non-identical (various) sizes.
Figure 2B:
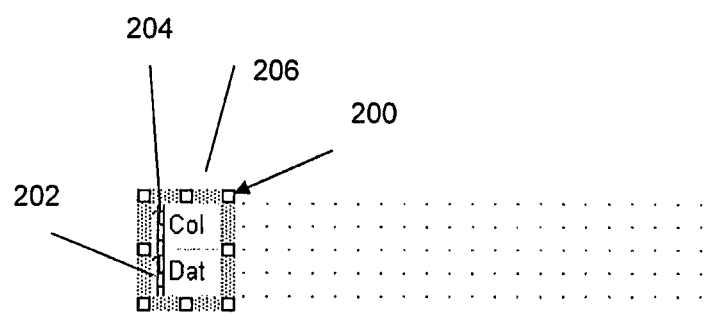
Figure 2C:
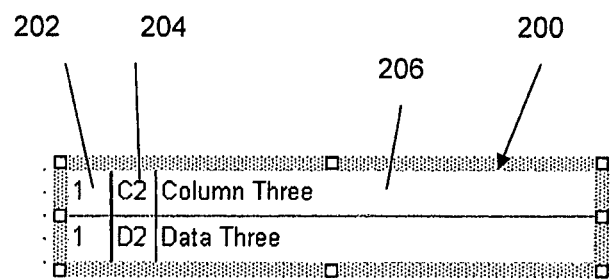

For example, FIGS. 2A-2C are diagrams of transitions for shrinking a parent object containing children objects of non-identical or various sizes. In FIG. 2A, a container or a parent object 200 has three children objects of non-identical sizes 202, 204 and 206. If a designer shrinks the parent container 200 with its children of non-identical sizes further than intended, thereby causing a child (e.g., child 202) to reach its minimum size (FIG. 2B), re-enlarging the container 200 (in the same resize operation) will result in the children 202, 204 and 206 with relative sizes that no longer match the original sizes (FIG. 2C), because the children grew relative to their shrunk sizes. For example, in FIG. 2C, the child object 202 is wider than its original size in FIG. 2A and the child object 204 is narrower than its original size in FIG. 2A, even though at the end of the resize operation the user returned the container 200 to its original size.

Figure 3:
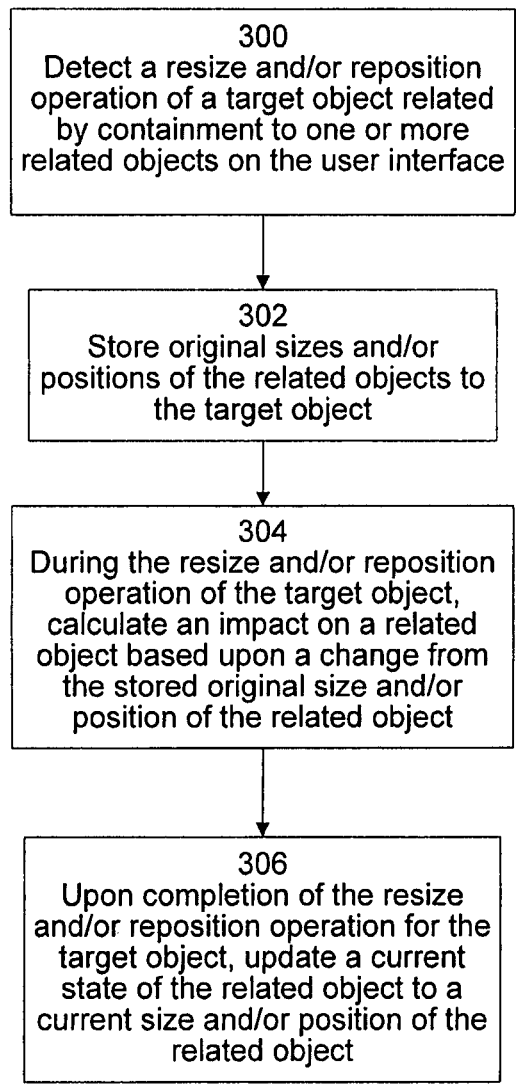
FIG. 3 is a flow chart of resizing and/or repositioning a target object laid out on a computer user interface.
Figure 4A:
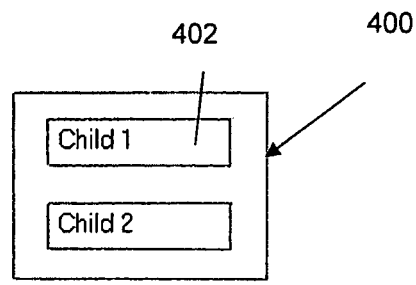
FIGS. 4A-4C are diagrams of transitions for enlarging a child (contained) object to extend outside of the parent (container) object.
Figure 4B:
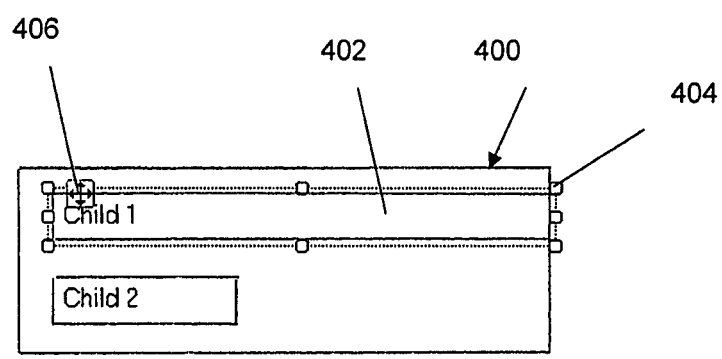
Figure 4C:
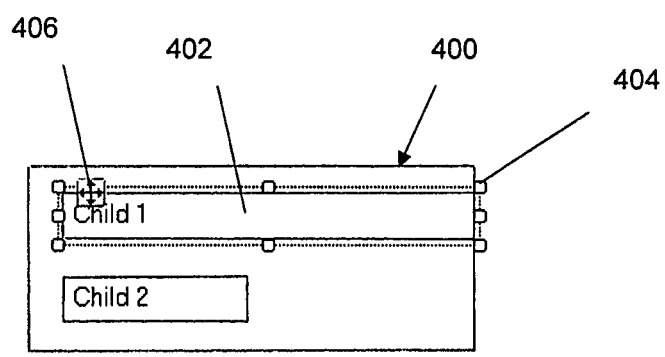
Figure 5A:
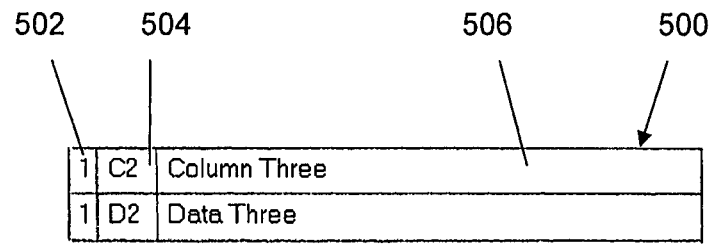
FIGS. 5A-5C are diagrams of transitions for shrinking a parent (container) object containing children (contained) objects of various sizes.
Figure 5B:
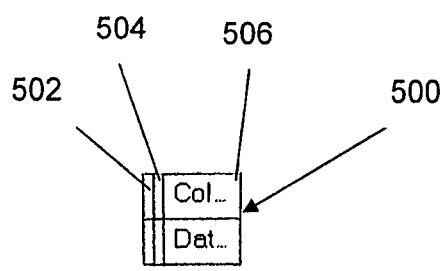
Figure 5C:
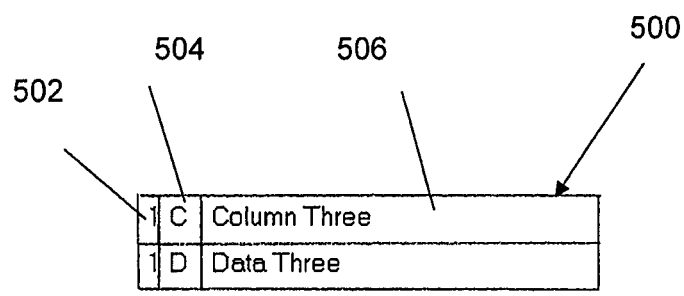

FIG. 3 is a flow chart of resizing and/or repositioning of a target object laid out on a computer user interface. FIGS. 4A-4C are diagrams of transitions for enlarging a child object to extend outside of the parent object in a manner consistent with the process described in FIG. 3. The embodiments are not limited to FIGS. 4A-4C, but can be applied to any manipulation of a contained object that causes its container to automatically enlarge according to a parent/child object interaction rule. For example, resizing the contained object to extend outside of its container object and/or repositioning (moving) the contained object to be outside its container, cause the container to grow. FIGS. 5A-5C are diagrams of transitions for shrinking a parent object containing children of various sizes in a manner consistent with the process described in FIG. 3.

In FIG. 3, at operation 300, a resize and/or reposition operation of a target object related by containment to one or more related objects on the user interface is detected. The target object is the object manipulated by the user (e.g., stretched, moved, etc.) and can be either a container object or an object contained by a container object. In FIG. 4A, a parent object 400 contains a child object 402. For example, in FIGS. 4A-C, when a user selects the child object 402, a resize handle 404 and/or a reposition handle 406 can be displayed to resize and/or reposition the child object 402 as a target object. Upon user manipulation (e.g., movement) of the handles 404, 406, a resize and/or reposition operation of the target object 402 can be detected. In FIG. 5A, a resize handle and/or reposition handle for parent object 500 can be similar to FIG. 4A.

According to an aspect of an embodiment, the target object can be one or more child objects of any size or shape and in any position contained in one or more parent objects of any size or shape, the target object can be one or more parent objects of any size or shape containing one or more child objects of any size or shape and in any position, or any combinations thereof. According to an aspect of an embodiment, a target object can be any item having a parent and/or child items (ancestors and/or descendents) as displayed on a computer user interface, for example, objects displayed by diagramming tools, data reporting tool, displayed windows, or any combinations thereof. An ancestor and/or a descendant can be direct or indirect. The target object can be resized in any display coordinate direction. The target object can be positioned in any display coordinate position. A child object might itself be a container for other objects.

In FIG. 3, at operation 302, original sizes and/or positions of objects related to the target object are stored. The related objects can include the target object whose original size and/or position is stored at operation 302. For example, in FIG. 4B, when, at operation 300, enlargement of the child object 402 (the target object) is detected, at operation 302, the sizes and/or positions of objects related to the target object 402 are stored as original sizes and/or positions of such related objects. As an example, in FIG. 4B, at operation 302, the original size and/or position of the child object 402 and the parent object 400 are stored, which in this example are all the objects related to the target object 402 being resized and/or repositioned. For example, in FIG. 5B, when at operation 300 shrinkage of the parent object 500 (the target object) is detected, at operation 302, the sizes and/or positions of objects related to the target object 500 are stored as original sizes and/or positions of such related objects. As an example, in FIG. 5B, at operation 302, the original size and/or position of the parent object 500 and the child objects 502, 504 and 506 are stored, which in this example are all the objects related to the target object 500 being resized and/or repositioned.

In FIG. 3, at operation 304, during the resize and/or reposition operation of the target object, an impact on the related objects is calculated, based upon a change from the stored original positions and/or sizes of the related objects. According to an aspect of an embodiment, in FIG. 3, at operation 304 at least one impact on at least one related object is determined based (in part) on the original position and/or size of the one related object. Calculation of an impact on a related object refers to enforcement of and/or changes to any applicable parent/child object interaction rule for the related object. According to an aspect of an embodiment, at operation 304, the calculating of the impact on the related objects enforces any applicable rules for each related object. A rule can be whether a related object overlaps, a related object resizes, a related object moves, a related object resizes to accommodate the target object, a related object resizes proportional and/or non-proportional to a resize of another object, a related object repositions based upon another object, or any combinations thereof.

As the resize and/or reposition operation of the target object proceeds (e.g., via a mouse drag) until conclusion of the resize and/or reposition operation (e.g., via releasing the resize and/or reposition handle of the target object, for example, by releasing the mouse button), an impact on the objects related to the target object (ancestors and/or descendents) is calculated based on the change from the original sizes/positions of such related objects stored in operation 302, rather than from an immediately preceding size and/or position for such related objects during the resize and/or reposition operation. For example, the resize and/or reposition operation can be a single operation of visual experimentation with a size and/or position of a target object and one or more objects related to the target object.

According to an aspect of an embodiment, an original position and/or size of a particular object is a first position and/or size of the particular object upon detection or occurrence of a resize and/or reposition operation for another object as a target object that impacts or could impact the particular object. Operation 302 preserves the original and/or any intermediate state(s) of the related objects for a target object. In contrast to the embodiments described in FIGS. 3, 4A-4C and 5A-5C, in FIG. 1B the instant the parent object 100 starts to enlarge to accommodate enlargement of the child object 102 beyond an edge of the parent object 100, the original size of the parent object 100 is immediately lost by retaining only a current size of the parent 100. As the parent 100 enlarges some more, the preceding size is lost since only the current size of the parent 100 is retained. For example, in FIG. 1C, when the target child 102 is shrunk, the related parent object 100, which was enlarged in FIG. 1B to accommodate the enlarged target child 102 while the user experimented with the size of the target child object 102, does not shrink back correspondingly, because the original size of the parent object 100 has been lost.

However, as shown for example in FIG. 4B, when using the process shown in FIG. 3, during the resize and/or reposition operation of the child object 402 (the target object), an impact on the related objects of the target child object 402 (in this example related parent object 400) is calculated based upon a change from the original positions and/or sizes of the related objects stored in operation 302. This not only allows the parent object 400 to shrink when necessary, it also allows the parent object 400 to stop shrinking when it reaches its original size. In FIG. 4B, at operation 304, the impact of the resize and/or reposition operation is calculated based upon a change from the stored original positions and/or size of the related parent object 400. In FIG. 4B, the resize and/or reposition operation enlarges the child object 402 beyond an edge of the parent object 400 (a related object) and in FIG. 4C shrinking (re-shrinking) the child object 402 after the enlarging, and the calculating the impact on the parent object during the shrinking is based upon the stored original size of the parent object 400 before the enlarging. For example, in FIG. 4B, the parent object 400 enlarges together with the child object 402 during the enlarging of the child object 402 beyond the edge of the parent object 400. And in FIG. 4C, the parent object 400 shrinks together with the child object 402 during the shrinking of the child object 402 until reaching a threshold based upon the stored original size of the parent object. According to an aspect of an embodiment, the threshold is the original size of parent object 400. However, the embodiments are not limited to the FIGS. 4B and 4C resize configuration; in one embodiment, the parent object 400 can shrink below its size at the start of the current resize operation.

In FIG. 5B, during the resize and/or reposition operation of the parent object 500 (the target object), an impact on the related objects, in this example, child column objects 502, 504 and 506, is calculated based upon a change from the original positions and/or sizes of the related objects stored in operation 302. In FIG. 5B, at operation 304, the impact of the resize and/or reposition operation is calculated based upon a change from the stored original positions and/or size of the related child objects 502, 504 and 506. In FIG. 5B, the resize and/or reposition operation shrinks the parent object 500 until the child objects 502, 504 and 506 (related objects) reach a minimum size and in FIG. 5C the same operation later enlarges the parent object 500. In FIG. 5C, the calculating of the impact on the child objects (related objects) 502, 504 and 506 (due to the enlarging of the parent object 500) is based upon the stored original size of the child objects 502, 504 and 506 before the shrinking. In FIG. 5B, the child objects 502, 504 and 506 shrink together with the parent object 500 during the shrinking of the parent object 500, and the child objects 502, 504 and 506 re-enlarge together with the parent object 500 during the re-enlarging of the parent object 500 until reaching a threshold based upon the stored original size of the child objects 502, 504 and 506. According to an aspect of an embodiment, the threshold is the original sizes of child objects 502, 504 and 506. As shown in FIG. 5C, the children objects 502, 504 and 506 regrow proportional to their original sizes (rather than proportional to their shrunk sizes) by retaining the original sizes and/or positions of the children objects (related objects) 502, 504, 506. Further, the embodiments are not limited to the FIGS. 5B and 5C resize configuration, and the child objects 502, 504 and 506 can re-enlarge larger than their size at the start of the current resize operation.

The embodiments allow for a target object resize and/or reposition experiment that preserves intermediate sizes and/or positions, including the original sizes and/or positions, of the related objects during the experiment operation. In FIGS. 4A-4C and FIGS. 5A-5C, using the resize operation of FIGS. 4A-4C as an example, operations 302 and 304 may retain during the target child's 402 resize operation, both the parent's 400 current size during the resize of the target child 402 and the original size of the parent 400 before the parent started resizing (i.e., original size of parent 400 in FIG. 4A). When the user starts a resize and/or reposition operation of any sort, the sizes and/or positions of related objects, including the target object, are preserved—which is the original state. When the original state of a related object is preserved, then as the current size of the related object changes, the related object's intermediate states during the resize operation (possibly limited by the related object's original state), are preserved by calculating the changes of the related object based (in part) upon the original state of the related object. For example, after the parent 400 has been enlarged due to enlargement of the child object 402, the parent 400 shrinks together with the shrinking child object 402 until reaching a threshold of its original size as shown in FIG. 4C. According to an aspect of an embodiment, in FIGS. 3 and 4A-4C, at operation 304, enlargement experiment of the target child object 402 to extend outside of the parent object 400 causes both the target child object 402 and the parent object 400 to grow and shrink together until conclusion of the enlargement experiment. Therefore, the embodiment allows for a target child object 402 resize experiment that preserves intermediate sizes, including the original size, of the parent object 400 during the target child object 402 resize experiment after causing the parent object to automatically grow. In this case, the embodiment allows a container configuration subsequent to growth of the container to be dependent on the initial container configuration rather than on only intermediate container configuration tries that have been subsequently abandoned. Typically the parent object 400 shrinks until the parent object 400 reaches its original size in FIG. 4A.

In FIG. 3, at operation 306, upon conclusion of the resize and/or reposition operation for the target object (e.g., via releasing the mouse), a current state of the related objects is retained (e.g., current states of the related objects is updated to current positions and/or sizes of the related objects). More particularly, after the resizing and/or reposition operation is concluded, for example, when the resize and/or reposition handle is released, the currently calculated sizes and/or positions of the target object and the related objects become new original sizes, which are stored at operation 302 upon detecting at operation 300 another new resize and/or reposition operation.

For example, according to an aspect of an embodiment, nondestructive experimentation with a size and/or a position of a target object related to other objects by containment can be provided, as follows:

1. Parent size elasticity when resizing children.
2. Child size elasticity when resizing parents wholly (or partially as the case may be) comprised of component children.

Further, parent and/or child size elasticity when repositioning children and/or parents is similar to parent and/or child size elasticity when resizing children and/or parents. According to an aspect of an embodiment elasticity of the parent when moving (repositioning) a child, for example, when a child being repositioned collides with its parent causes the parent to grow, can be provided as an expected impact (side effect) or through appropriate separate application user interface gesture.

The embodiments have been described with respect to a layout design tool providing "elastic" object resizing and/or repositioning behavior which preserves both the original sizes and/or positions of impacted object(s), and restores intermediate states of the impacted object(s) as the designer experiments with sizes and/or positions of target object(s). The embodiments provide the ability to nondestructively experiment with a size and/or a position of a target object. The embodiments resize and/or reposition (i.e., resize, reposition or both) a target object related by containment to one or more related objects laid out on a computer user interface by storing (retaining) original sizes and/or positions of the related objects to the target object resized and/or repositioned. During the resize and/or reposition operation of the target object, an impact on the related objects is calculated based upon a change from the stored original sizes and/or positions of the related objects. Upon conclusion of the resize and/or reposition operation for the target object, a current state of the related objects is updated to a current size and/or position of the related objects. According to an aspect of an embodiment, a spatial interaction between a container and a contained object is managed based upon a change from original sizes and/or positions of the container and the contained object prior to the spatial interaction.

Therefore, using a resizing as an example, when a resize operation on a target object begins, the original sizes and positions of objects impacted by the resize (i.e. ancestors and descendents of the target object being resized) are stored. For example, typically a resize operation can be initiated via a mouse click-and-hold on a resize handle of the target object. Examples of benefits (not required) of the embodiments can be as follows:

EXAMPLE 1

When a designer enlarges a child object such that the child object extends outside of its parent (thus automatically extending its parent) but goes further than intended and then the designer reshrinks the child, the parent will shrink with the child (but not shrink below the size it was at the start of the resize operation). However, the embodiments are not limited to such a configuration, and the parent can shrink below the size it had at the start of the resize operation.

EXAMPLE 2

A designer shrinks a container with children of non-identical or various sizes further than intended (thereby causing a child to reach its minimum size), then re-enlarges the container. The children will regrow proportional to their original sizes (rather than proportional to their shrink sizes).

The embodiments also apply to a reposition operation of a target object related to one or more objects by containment. The objects can be two-dimensional, three-dimensional, or any combinations thereof.

Figure 6:
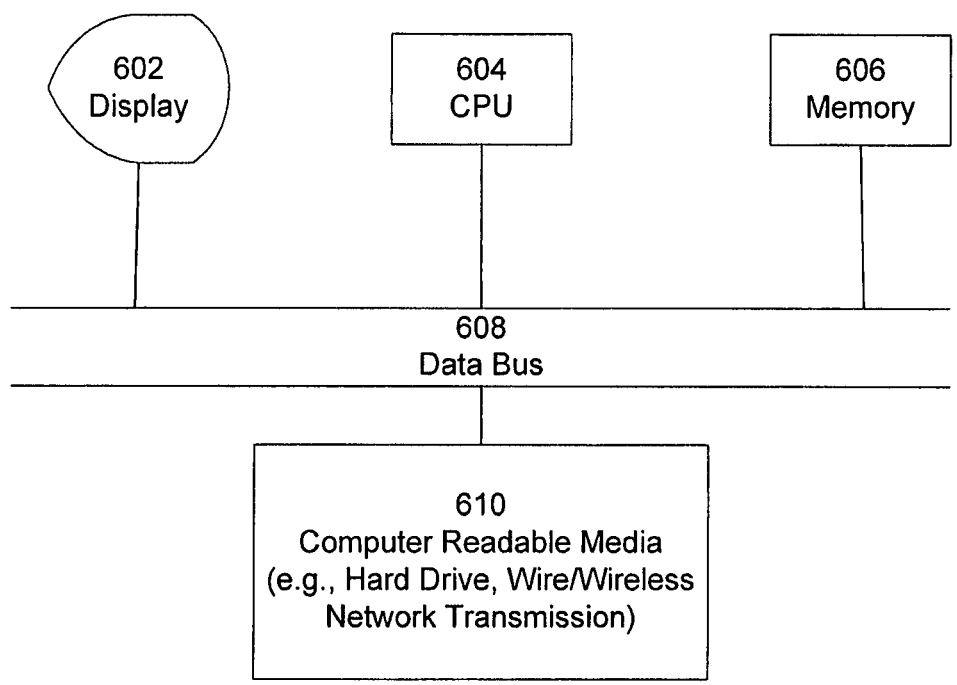
FIG. 6 is a diagram of an apparatus resizing and/or repositioning a target object laid out on a computer user interface.

FIG. 6 is a diagram of an apparatus resizing and/or repositioning a target object laid out on a computer user interface, according to an embodiment. In FIG. 6, the apparatus can be any computing device, for example, a personal computer. Typically, the apparatus includes a display 602 to display a user interface. A controller 604 (e.g., a central processing unit) executes instructions (e.g., a computer program or software) that control the apparatus to perform operations. Typically, a memory 606 stores the instructions for execution by the controller 604. According to an aspect of an embodiment, the apparatus reads any computer readable media 610, such as (without limitation) a hard drive, or wire/wireless network transmission. The display 602, the CPU 604, the memory 604 and the computer readable media 610 are in communication by the data bus 608. The described examples of embodiments can be software (as stored or encoded on any known computer readable media, such as, without limitation, compact disk, Digital Versatile Disc (DVD), memory, carrier wave or electromagnetic signals, etc.) and/or on any computing hardware.

For example, the embodiments may be included as part of a user interface in any computing tool (software) providing a visual layout of objects related to each other by containment, such as (without limitation) data table designers or data reporting tools (e.g., MICROSOFT SQL server, MICROSOFT EXCEL), or drawing and diagramming computing tools (e.g., MICROSOFT VISUAL STUDIO). For example, the embodiments can be provided as an object layout option through a user interface option, namely, a non-destructive resizing and/or repositioning of objects related by containment option (i.e., elastic resizing and/or repositioning option).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of resizing and/or repositioning an object, comprising:

providing targetable and related objects selectable from among container and contained objects laid out on a computer user interface, a targeted container object is selectable as a target object without selecting a related object comprising a contained object wholly or partially contained by the targeted container object, and a targeted contained object is selectable as a target object without selecting a related object comprising a container object that wholly or partially contains the targeted contained object;

detecting an operation on a target object;

maintaining an independent relationship between the target object and a related object during the operation by permitting movement of the target object independent of the related object; and maintaining a dependent relationship between the target object and the related object during the operation by:

storing an original size and/or position of the related object prevailing upon the detection of the operation; and during the operation, calculating an impact on the related object based upon a change from the stored original size and/or position, thereby permitting non-destructive experimental operations that do not destroy a relationship between the target and related objects existing before the operation.

2. The method according to claim 1, further comprising upon conclusion of the operation, updating a current state of the related object to a current size and/or position of the related object prevailing upon the conclusion of the operation.

3. The method according to claim 2, further comprising storing the current size and/or position of the related object as the original size and/or position of the related objects upon detecting another operation.

4. The method according to claim 1, wherein the target object is a plurality of objects comprising one or more child objects, one or more parent objects, and a combination thereof.

5. The method according to claim 4, the target object comprising a child object and the related object comprising a parent object, wherein the resize and/or reposition operation is a resize operation of enlarging the child object to extend beyond an edge of the parent object and shrinking the child object after the enlarging, and the calculating of the impact on the parent object during the shrinking is based upon the stored original size of the parent object before the enlarging.

6. The method according to claim 5, wherein the parent object enlarges together with the child object during the enlarging of the child object beyond the edge of the parent object, and the parent object shrinks together with the child object during the shrinking of the child object until reaching a threshold based upon the stored original size of the parent object.

7. The method according to claim 4, the target object comprising a parent object and the related object comprising a target object, wherein the resize and/or reposition operation is a resize operation of shrinking the parent object until the child object reaches a minimum size and enlarging the parent object after the shrinking, and the calculating of the impact on the child object during the enlarging is based upon the stored original size of the child object before the shrinking.

8. The method according to claim 7, wherein the child object shrinks together with the parent object during the shrinking of the parent object, and the child object enlarges proportional to the original size of the child object together with the parent object during the enlarging of the parent object until reaching a threshold based upon the stored original size of the child object.

9. The method according to claim 1, wherein the calculating of the impact on the related object comprises enforcing a rule for the related object.

10. The method according to claim 9, wherein the rule comprises whether the related object overlaps, the related object resizes, the related object repositions, or any combinations thereof.

11. An apparatus displaying targetable and related objects selectable from among container and contained objects on a computer user interface, a targeted container object is selectable as a target object without selecting a related object comprising a contained object wholly or partially contained by the targeted container object, and a targeted contained object is selectable as a target object without selecting a related object comprising a container object that wholly or partially contains the targeted contained object, the apparatus comprising:

a controller that, during an operation, maintains an independent relationship between a target object and a related object by permitting movement of the target object independent of the related object and maintains a dependent relationship between the target object and the related object by: calculating an impact on the related object based upon a change from an original size and/or position of the related object prevailing upon the detection of the operation, thereby permitting non-destructive experimental operations that do not destroy a relationship between the target and related objects existing before the operation.

12. The apparatus according to claim 11, wherein the target object is a plurality of objects comprising one or more child objects, one or more parent objects, and a combination thereof.

13. The apparatus according to claim 11, wherein the calculating of the impact on the related object comprises enforcing a rule for the related object.

14. The apparatus according to claim 13, wherein the rule comprises whether the related object overlaps, the related object resizes, the related object repositions, or any combinations thereof.

15. The apparatus according to claim 11, wherein the operation is a single operation, and upon conclusion of the single operation, the controller updates a current state of the related object to a current size and/or position of the related object prevailing upon the conclusion of the single operation.

16. A computer readable memory storing a program for controlling a computer according to a process comprising:

displaying targetable and related objects selectable from among container and contained objects on a computer user interface, a targeted container object is selectable as a target object without selecting a related object comprising a contained object wholly or partially contained by the targeted container object, and a targeted contained object is selectable as a target object without selecting a related object comprising a container object that wholly or partially contains the targeted contained object; and managing a spatial interaction between a target and a related object by:

maintaining an independent relationship between the target object and a related object during the spatial interaction by permitting movement of the target object independent of the related object, and maintaining a dependent relationship between the target object and the related object during the spatial interaction by managing the spatial interaction based upon a change from original sizes and/or positions of the target and the related object prevailing upon initiation of the spatial interaction, thereby permitting non-destructive experimental change during the spatial interaction that does not destroy a spatial relationship between the target and related objects existing before the spatial interaction.

17. The memory according to claim 16, wherein the spatial interaction is a resize and/or reposition operation.

18. The memory according to claim 17, the target object comprising a contained object and the related object comprising a container object, wherein the resize and/or reposition operation comprises enlarging the contained object to extend beyond a boundary of the container and re-shrinking the contained object.

19. The memory according to claim 17, the target object comprising a container object and the related object comprising a contained object, wherein the resize and/or reposition operation comprises shrinking the container object until the contained object reaches a minimum size and re-enlarging the container object.

20. The memory according to claim 16, wherein the managing of the spatial interaction comprises calculating an impact for enforcing a rule on the related object.

* * * * *